US006772271B2

United States Patent
Fujii

(10) Patent No.: US 6,772,271 B2
(45) Date of Patent: Aug. 3, 2004

(54) REDUCTION OF BANK SWITCHING INSTRUCTIONS IN MAIN MEMORY OF DATA PROCESSING APPARATUS HAVING MAIN MEMORY AND PLURAL MEMORY

(75) Inventor: Yasunori Fujii, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 125 days.

(21) Appl. No.: 10/114,978

(22) Filed: Apr. 4, 2002

(65) Prior Publication Data

US 2002/0156964 A1 Oct. 24, 2002

(30) Foreign Application Priority Data

Apr. 18, 2001 (JP) ........................................ 2001-119852

(51) Int. Cl.[7] .............................................. G06F 12/00
(52) U.S. Cl. ............................. 711/5; 711/5; 711/157; 711/207; 711/217; 711/218
(58) Field of Search .......................... 711/5, 157, 207, 711/217, 218

(56) References Cited

U.S. PATENT DOCUMENTS

| 4,713,759 A | 12/1987 | Yamagishi et al. | |
| 5,146,581 A | * 9/1992 | Kaneko | 711/5 |
| 5,557,766 A | * 9/1996 | Takiguchi et al. | 711/5 |

FOREIGN PATENT DOCUMENTS

EP    0 330 226 A2    8/1989

OTHER PUBLICATIONS

K. Baker, "Interbank Function Calling In ROM Banks", *Electronic Design*, vol. 44, No. 2, Jan. 22, 1996, Penton Publishing, Cleveland, OH, U.S.

* cited by examiner

Primary Examiner—Donald Sparks
Assistant Examiner—Bao Truong
(74) Attorney, Agent, or Firm—Foley & Lardner LLP

(57) ABSTRACT

A data processing apparatus has a main memory and a plurality of memory banks. A bank switching instruction designating a particular bank address of the first memory bank is stored in an arbitrary memory space in the main memory. A main return instruction designating a particular main address of the main memory is stored in the memory address represented by a particular bank address of the nth memory bank. When the bank switching instruction is read, the readout destination is branched to the first memory bank. Data stored in the first memory bank, the second memory bank, . . . , and the nth memory bank are successively read. When the main return instruction is read from the nth memory bank, the readout destination returns to the main memory.

8 Claims, 6 Drawing Sheets

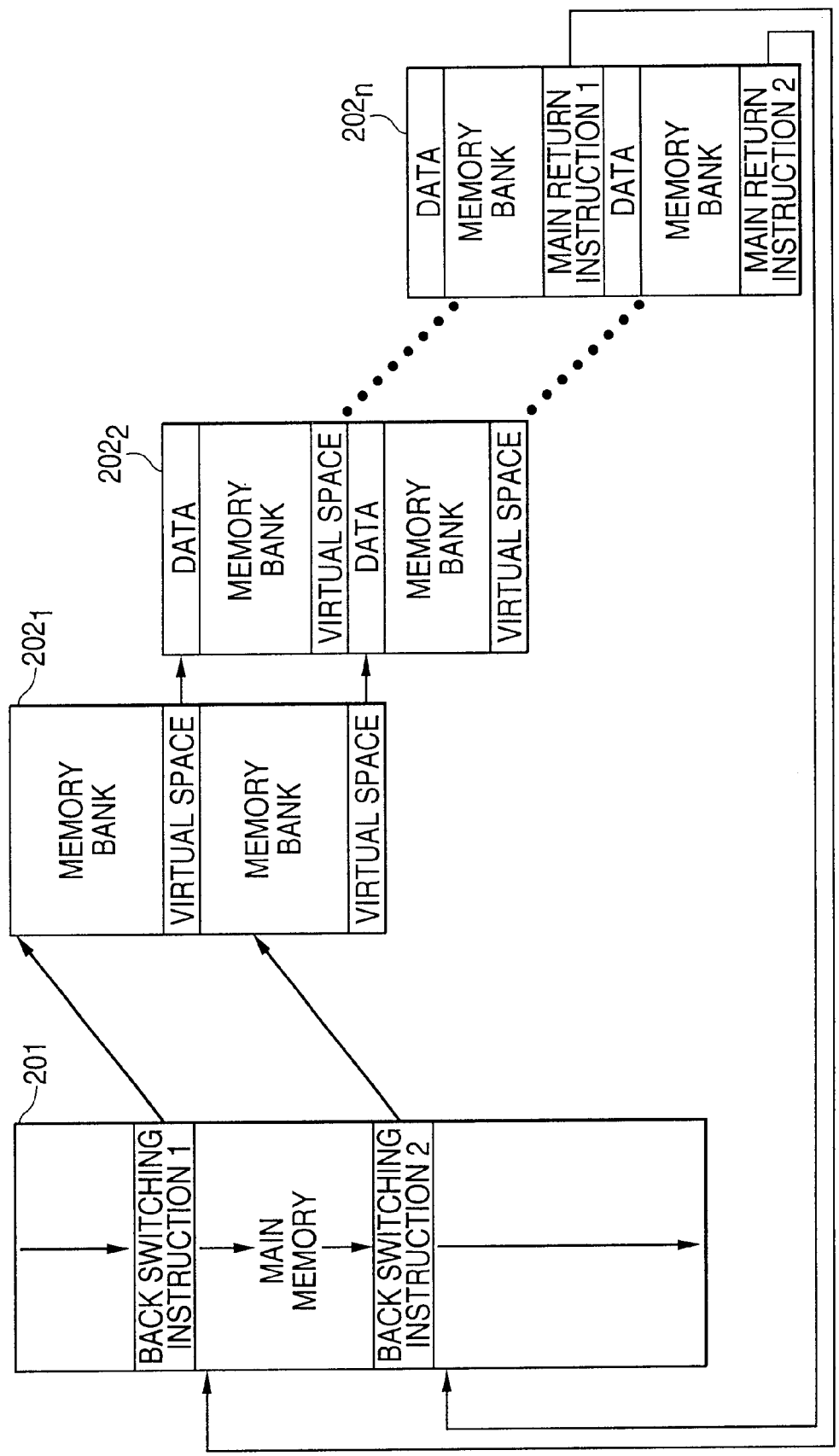

REDUCTION OF BANK SWITCHING INSTRUCTIONS IN MAIN MEMORY OF DATA PROCESSING APPARATUS HAVING MAIN MEMORY AND PLURAL MEMORY

BACKGROUND OF THE INVENTION

1. Field of the Invention

The present invention relates to a data processing apparatus having a main memory and a plurality of memory banks.

2. Description of the Related Art

One conventional data processing apparatus will be described below with reference to FIGS. 1 and 2 of the accompanying drawings. As shown in FIG. 1, the data processing apparatus has main memory 101, n memory banks $102_1$, through $102_n$, CPU (Central Processing Unit) 103, and register circuit 104.

Main memory 101 has a number of successive memory spaces each having a series of main addresses "000", "001", . . . , "010" set thereto. Memory banks $102_1$ through $102_n$ also have a plurality of successive memory spaces, and the memory spaces of each memory bank have common successive bank addresses "011", "012", . . . , "100" set thereto. CPU 103 is connected to main memory 101 and memory banks $102_1$ through $102_n$ by address bus 105 and a data bus (not shown), and reads data stored in main memory 101 successively in the order of the main addresses and data stored in memory banks $102_1$ through $102_n$ successively in the order of the bank addresses. Register circuit 104 is connected to main memory 101, memory banks $102_1$ through $102_n$, and CPU 103, and is controlled by CPU 103 to store the bank number of one of memory banks $102_1$ through $102_n$.

In the conventional data processing apparatus, a series of computer program instructions for CPU 103 are stored in main memory 101 and memory banks $102_1$ through $102_n$. CPU 103 reads the computer program instructions and executes data processing according to the read computer program instructions.

As shown in FIG. 2 of the accompanying drawings, main memory 101 stores, at arbitrary main addresses, a first bank switching instruction, a second bank switching instruction, . . . , an nth bank switching instruction for branching readout destinations for CPU 103 to respective memory banks $102_1$, $102_2$, . . . , $102_n$. Memory banks $102_1$, $102_2$, . . . , $102_n$ store, at respective final bank addresses, a first main return instruction, a second main return instruction, . . . , an nth main return instruction for branching readout destinations for CPU 103 to respective main addresses next to those main addresses where the first bank switching instruction, the second bank switching instruction, . . . , the nth bank switching instruction are stored in main memory 101.

When CPU 103 reads the series of computer program instructions from the main memory 101 and memory banks $102_1$ through $102_n$, since stored data in main memory 101 are successively read from the first main address, the bank switching instructions are read from certain main addresses.

In the illustrated conventional data processing apparatus, the first bank switching instruction which is read first designates the first bank address in memory bank $102_1$, and hence the readout destination for CPU 103 is branched to the first bank address in memory bank $102_1$. At this time, CPU 103 stores the memory bank number "1" corresponding to the first bank switching instruction in register circuit 104. Therefore, only memory bank $102_1$, becomes valid, and memory banks $102_2$ through $102_n$ become invalid. As a result, CPU 103 reads stored data in memory bank $102_1$, successively from its bank addresses beginning with the first bank address until finally it reads the main return instruction. Since the main return instruction stored in memory bank $102_1$, designates the main address next to the main address where the first bank switching instruction is stored in main memory 101, the readout destination for CPU 103 becomes the main address next to the main address where the first bank switching instruction is stored in main memory 101.

Similarly, CPU 103 reads data from main memory 101, and each time CPU 103 reads a bank switching instruction, it reads stored data in a corresponding memory bank. When the readout of data from memory bank $102_n$, is completed, the processing returns to the readout of data from main memory 101.

The conventional data processing apparatus use common bank addresses shared by memory banks $102_1$ through $102_n$. When CPU 103 stores a memory bank number corresponding to a bank switching instruction in register circuit 104, plural memory banks 102 become valid one at a time. Therefore, a small number of bank addresses can be assigned to many memory spaces.

However, since it is necessary to store the first through nth bank switching instructions which designate first through nth memory banks memory banks $102_1$ through $102_n$, respectively, in main memory 101, some of the memory spaces in main memory 101 are consumed for storing these bank switching instructions.

Furthermore, the final bank addresses of first through nth memory banks memory banks $102_1$ through $102_n$ are required to set therein the first through nth main return instructions which designate the main addresses next to the main addresses where the first through nth bank switching instructions are stored in main memory 101. The process of setting the first through nth main return instructions in the final bank addresses is complex.

In addition, main memory 101 is unable to store considerably long successive data therein because the first through nth bank switching instructions are stored at arbitrary main addresses.

SUMMARY OF THE INVENTION

It is an object of the present invention to provide a data processing apparatus which minimizes the consumption in a main memory of memory spaces for bank switching instructions, is not required to set main return instructions inherent in respective memory banks, and is capable of storing considerably long successive data in the main memory.

According to a first aspect of the present invention, a data processing apparatus has a main memory, first through nth memory banks, a data processing circuit, and a bank switching means.

The main memory has a plurality of successive memory spaces each with a series of main addresses set thereto and stores in an arbitrary memory space thereof a bank switching instruction which designates a first bank address of the first memory bank. The first through nth memory banks have a plurality of successive memory spaces with a series of bank addresses set commonly thereto, and the first through (n-1)th memory banks having virtual spaces where no stored data is present in respective final bank addresses thereof. The nth memory bank stores in the memory space represented by the final bank address thereof a main return instruction which designates a particular main address of the main memory.

The data processing circuit reads stored data in the memory spaces successively from the main addresses beginning with a head address. The data processing circuit switches the readout destination therefor to the head bank address of the first memory bank and reads data successively from the first memory bank beginning with the head address. When the readout destination in the first memory bank reaches the bank address of the virtual space, the readout destination is switched to the second memory bank by the bank switching means, and the data processing circuit reads data successively from the second memory bank beginning with the head address. The above operation is repeated until the readout destination is switched to the nth memory bank. When the main return instruction is read from the final bank address of the nth memory bank, the readout destination returns to a particular main address of the main memory. Having read all the stored data in the memory banks, the data processing circuit reads data subsequent to the particular main address of the main memory.

According to a second aspect of the present invention, the main memory stores in an arbitrary memory space thereof a bank switching instruction which designates a particular bank address of the first memory bank, the first through (n-1)th memory banks have virtual spaces where no stored data is present in respective particular bank addresses thereof, and the nth memory bank stores in the memory space represented by a particular bank address thereof a main return instruction which designates a particular main address of the main memory.

When the data processing circuit reads stored data in the main memory up to a particular main address, the data processing circuit reads data from the memory banks up to the respective particular bank addresses. When the readout of the data is completed, the data processing circuit reads data subsequent to the particular main address of the main memory.

According to a third aspect of the present invention, the main memory stores in arbitrary memory spaces thereof bank switching instructions which designate a plurality of different bank addresses of the first memory bank, the first through (n-1)th memory banks have virtual spaces where no stored data is present in respective bank addresses thereof, and the nth memory bank stores in the memory spaces represented by the bank addresses thereof main return instructions which designate different particular main addresses of the main memory.

When the data processing circuit reads stored data in the main memory up to a first particular main address, the data processing circuit reads data from the memory banks up to the respective first particular bank addresses. When the readout of the data is completed, the data processing circuit reads stored data from the first particular main address to the second particular main address of the main memory, and reads stored data from the first particular bank address to the second particular bank address of each of the memory banks. The same operation is repeated until the stored data at the final address of the main memory is read.

According to the present invention, even though there are not as many bank switching instructions as the number of main banks in the main memory, the readout destination for the data processing circuit can be shifted successively from the main memory to the memory banks. Therefore, the memory spaces in the main memory can effectively be utilized.

When the data processing circuit reads the main return instruction from the nth memory bank, the data processing circuit returns the readout destination to the main address next to the main address where the bank switching instruction is stored in the main memory. Consequently, the memory spaces in the main memory can more effectively be utilized.

The above and other objects, features, and advantages of the present invention will become apparent from the following description with reference to the accompanying drawings which illustrate examples of the present invention.

BRIEF DESCRIPTION OF THE DRAWINGS

FIG. 6 is a diagram illustrative of the manner in which a CPU reads stored data from a main memory and a plurality of memory banks in a modified data processing apparatus according to the present invention.

DESCRIPTION OF THE PREFERRED EMBODIMENTS

Figure 1:
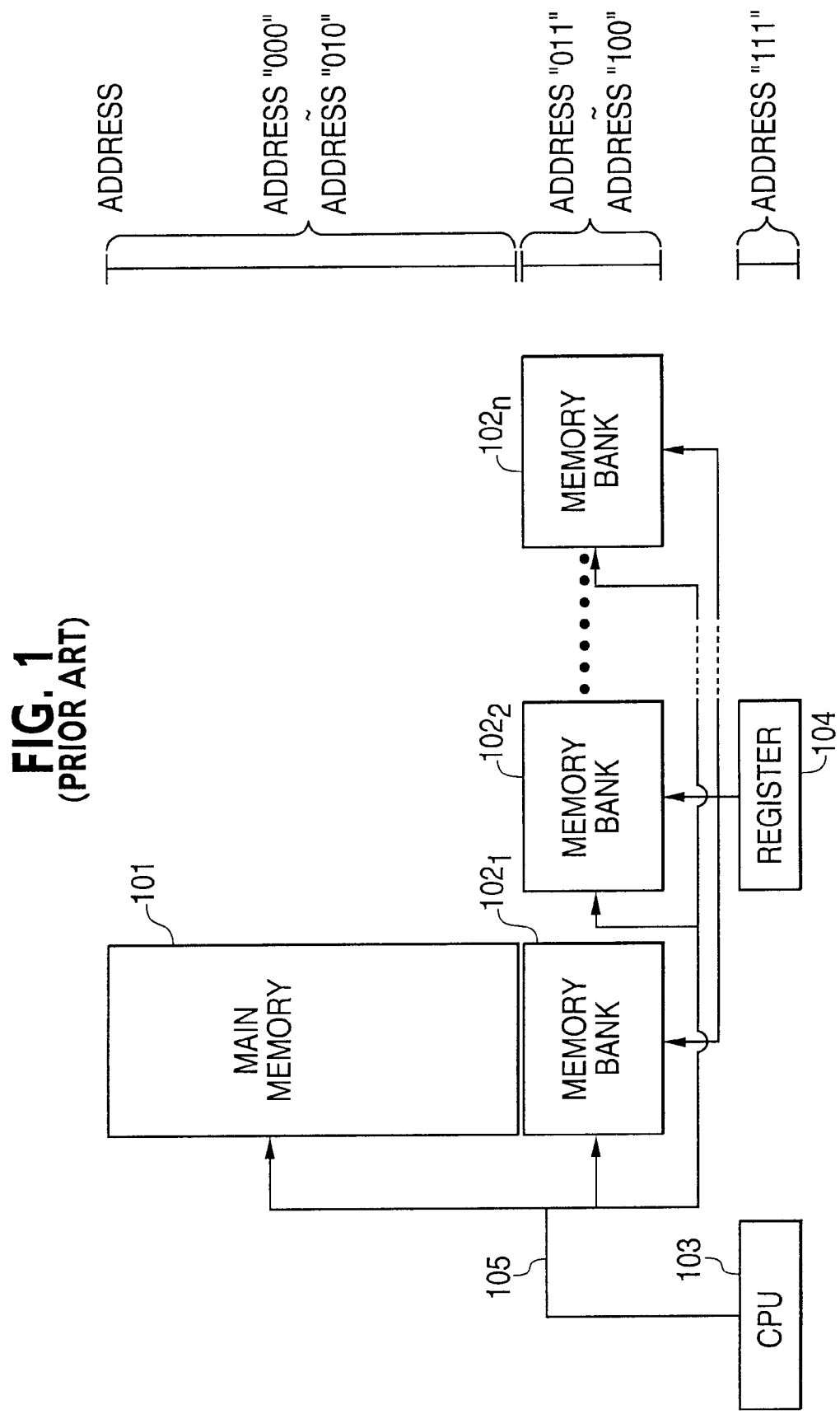
FIG. 1 is a block diagram of a conventional data processing apparatus.
Figure 2:
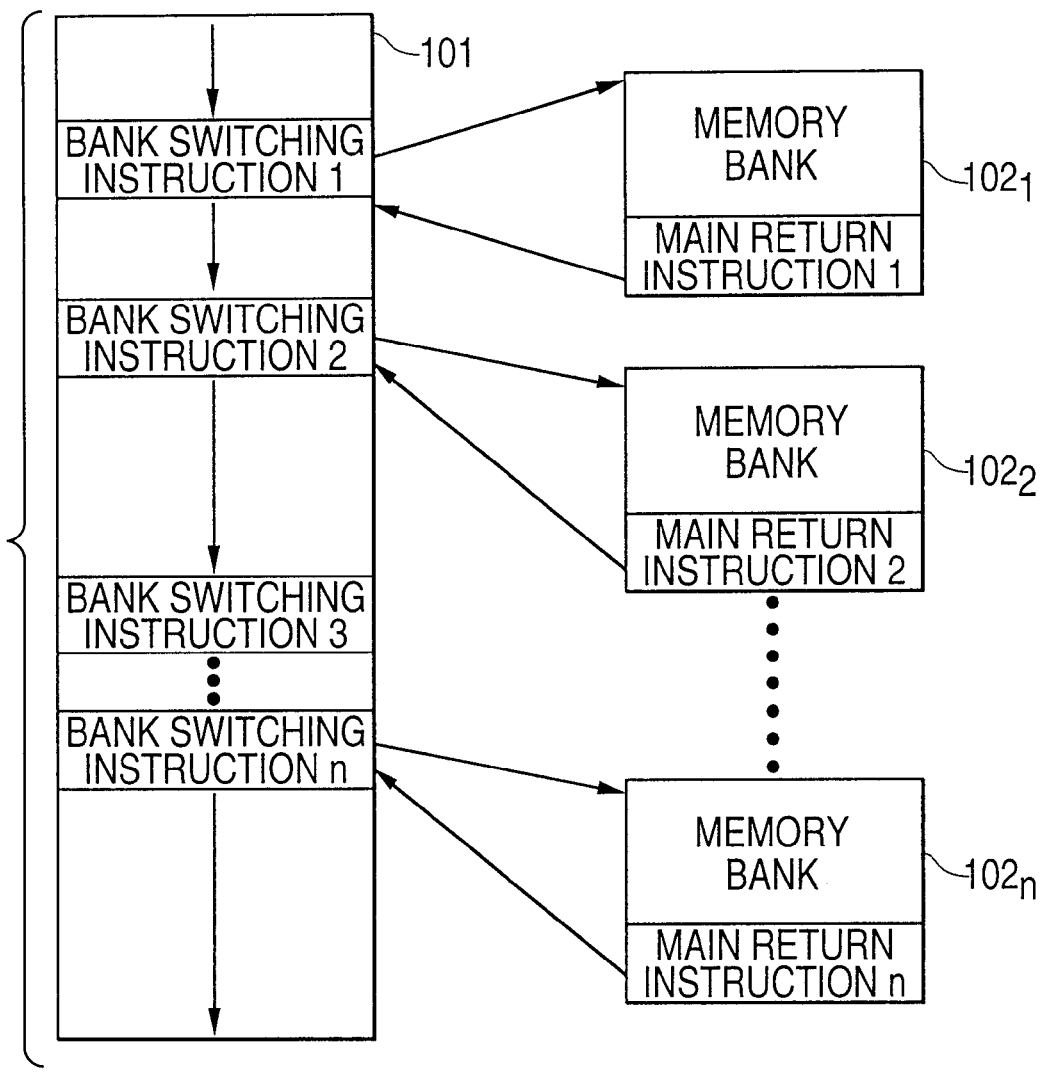
FIG. 2 is a diagram illustrative of the manner in which a CPU reads stored data from a main memory and a plurality of memory banks in the conventional data processing apparatus shown in FIG. 1.
Figure 3:
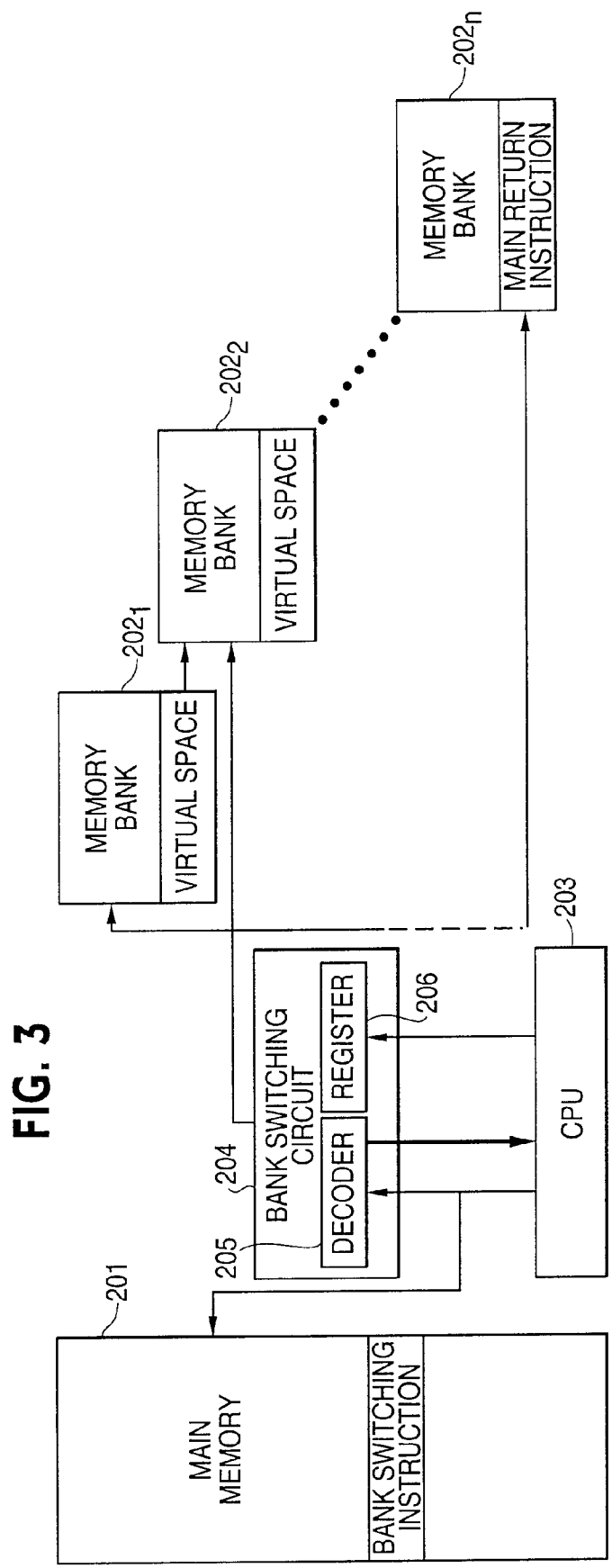
FIG. 3 is a block diagram of a data processing apparatus according to an embodiment of the present invention.

As shown in FIG. 3, a data processing apparatus according to an embodiment of the present invention has main memory 201, n memory banks $202_1$, through $202_n$, CPU 203, and bank switching circuit 204.

Main memory 201 has a number of successive memory spaces each having a series of main addresses "000", "001", . . . , "010" set thereto. Memory banks $202_1$, through $202_n$, also have a plurality of successive memory spaces, and the memory spaces of each memory bank have common successive bank addresses "011", "012", . . . , "100" set thereto. Main memory 201 stores in an arbitrary main address only a bank switching instruction designating the first bank address of first memory bank $202_1$. Memory banks $202_1$, through $202_{n-1}$ have virtual spaces where there are no stored data, set at their final bank addresses, respectively. The memory space at the final bank address of the nth memory bank $202_n$ stores a main return instruction designating a certain main address. The main return instruction designates the main address next to the main address where the bank switching instruction is stored in main memory 201.

CPU 203 is connected to main memory 201 and bank switching circuit 204, and bank switching circuit 204 is connected to memory banks $202_1$, through $202_n$. CPU 203 reads data stored in main memory 101 successively in the order of the main addresses and data stored in memory banks $202_1$, through $202_n$ successively in the order of the bank addresses. When CPU 203 reads the bank switching instruction from main memory 201, it switches its readout destination to the first bank address of first memory bank $202_1$, which is set in the bank switching instruction. When CPU 203 reads the main return instruction from the final bank address of the nth memory bank $202_n$, it switches its readout destination to the main address next to the main address where the bank switching instruction is stored in main memory 201.

Bank switching circuit 204 has decoder 205 and register 206. Decoder 205 decodes addresses of memory banks $202_1$, through $202_n$ which are output from CPU 203, and also decode data read from memory banks $202_1$, through $202_n$. Register 206 first stores the memory bank number "1" of the memory bank $202_1$. Each time the readout destination for CPU 203 in memory banks $202_1$, through $202_n$ reaches the bank address of each virtual space, CPU 203 increments the memory bank number in register 206 by "+1" in order to designate a next memory bank.

Figure 4:
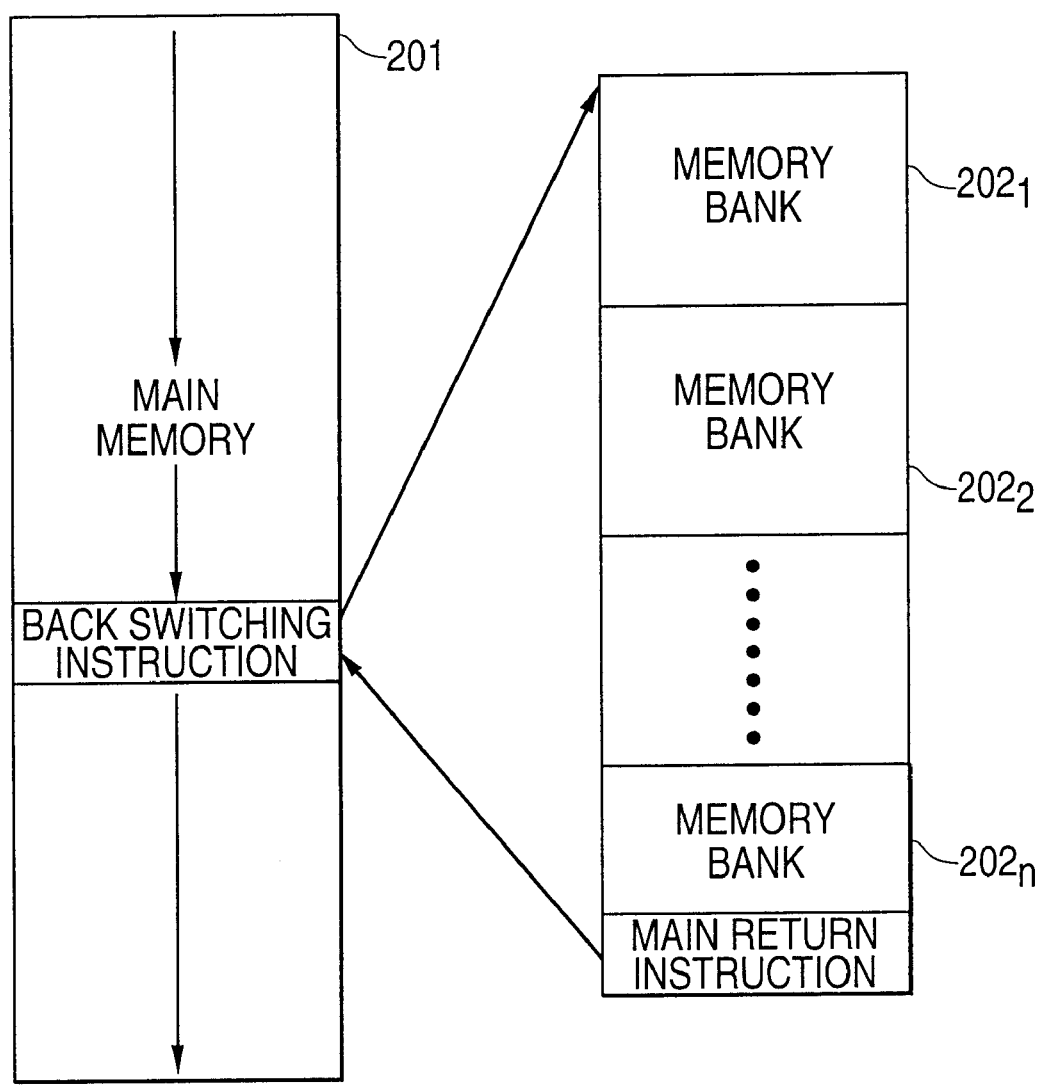
FIG. 4 is a diagram illustrative of the manner in which a CPU reads stored data from a main memory and a plurality of memory banks in the data processing apparatus shown in FIG. 3.
Figure 5:
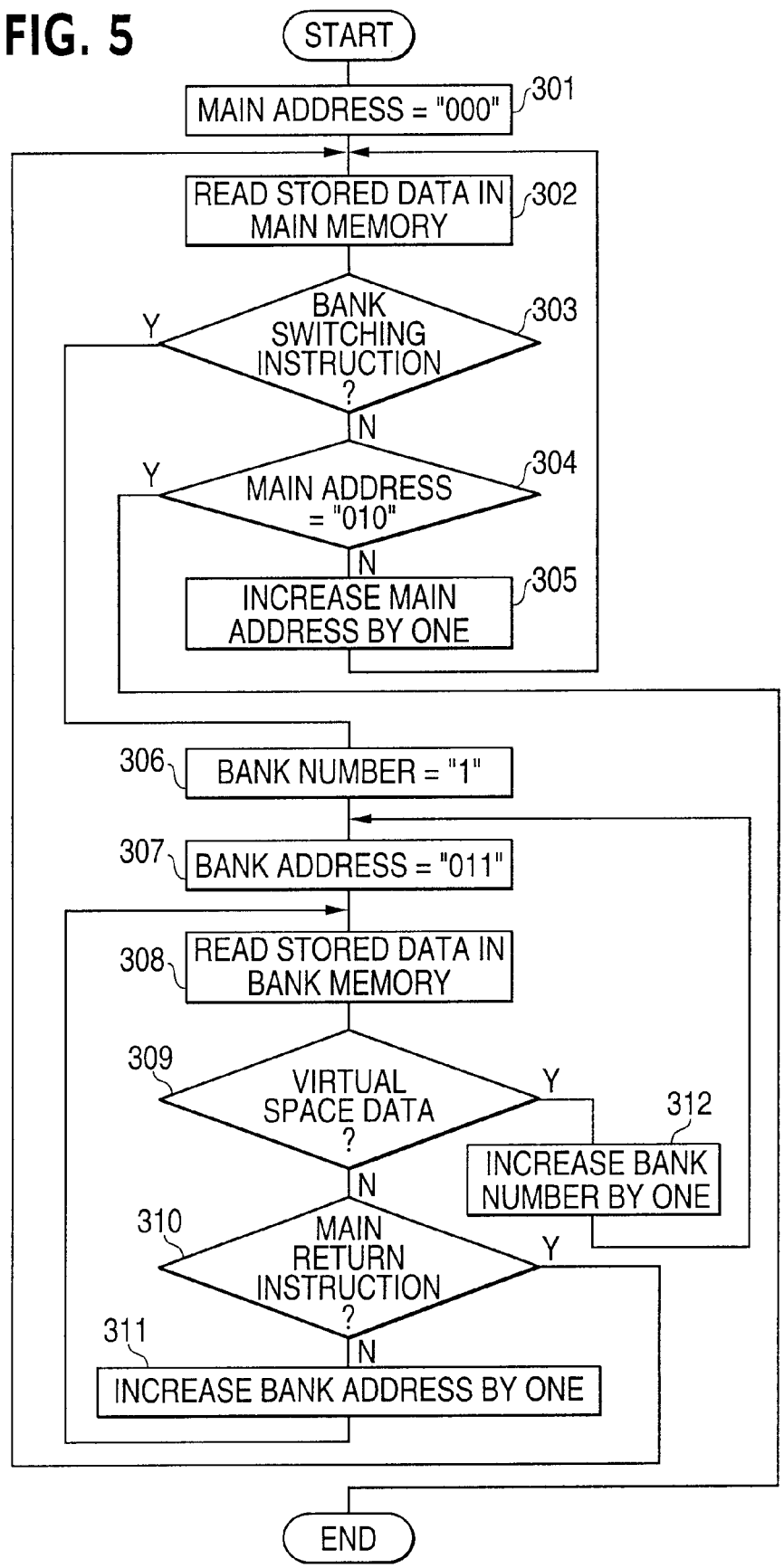
FIG. 5 is a flowchart of an operation sequence carried out by the CPU to read stored data from the main memory and the memory banks in the data processing apparatus shown in FIG. 3.

Operation of the data processing apparatus for CPU 203 to read a series of computer program instructions from main memory 201 and memory banks $202_1$, through $202_n$ and perform data processing according to the read computer program instructions will be described below with reference to FIGS. 4 and 5.

CPU 203 sets the main address to "000" in step 301 (see FIG. 5), and reads stored data in main memory 201 in step 302. Then, CPU 203 determines whether the read data is the bank switching instruction or not in step 303. If the read data is not the bank switching instruction, then CPU 203 determines whether the main address is the final main address "010" or not in step 304. If the main address is not the final main address "010", then CPU 203 increases the main address by one in step 305, and control goes back to step 302. If the read data is the bank switching instruction in step 303, then control goes to step 306 in which CPU 203 sets a bank number "1" in register 206. Therefore, only memory bank $202_1$, becomes valid, and memory banks $202_2$ through $202_n$ become invalid. Then, CPU 203 sets the first bank address "011" of the memory banks in step 307. In step 308, CPU 203 reads memory bank data. CPU 203 determines whether the read memory bank data is virtual space data or not in step 309. If the read memory bank data is virtual space data, then CPU 203 increases the bank number by one in register 206 in step 312. If the read memory bank data is not virtual space data, then CPU 203 determines whether the read memory bank data is a main return instruction or not in step 310. If the read memory bank data is not a main return instruction, then CPU 203 increases the bank address by one in step 311, after which control returns to step 308. If the read memory bank data is a main return instruction, then control goes back to step 302 in which CPU 203 reads data from the main address next to the main address where the bank switching instruction is stored in main memory 201. If the main address is the final main address "010" in step 304, then since all the data have been read, the operation sequence is put to an end.

With the data processing apparatus according to the present invention, as described above, because the readout destination for CPU 203 is shifted successively to memory banks $202_1$, through $202_n$ simply by setting a single bank switching instruction in main memory 201, the memory spaces in main memory 201 can effectively be utilized.

Furthermore, the data processing apparatus can be designed and manufactured with ease because there is no need for setting main return instructions in the respective final bank addresses of first through (n-1)th memory banks $202_1$, through $202_{n-1}$.

Inasmuch as only one bank switching instruction is set in main memory 201 for CPU 203 to read and operate on, it is easy to store long successive data in main memory 201. The main return instruction CPU 203 to read and operate on is set in only nth memory bank $202_n$, and CPU 203 is not involved in the control of shifting the readout destination in memory banks $202_1$, through $202_{n-1}$. Therefore, it is possible to store successive data in memory banks $202_1$, through $202_n$ handled as a single memory medium.

The present invention is not limited to the above embodiment, but various changes and modifications can be made to the illustrated embodiment without departing from the scope of the invention.

For example, in the data processing apparatus according to the illustrated embodiment, the readout destination for CPU 203 is branched to the first bank address of first memory bank $202_1$, by the bank switching instruction in main memory 201, and each time the readout destination for CPU 203 reaches the final bank address of each of first through (n-1)th memory banks $202_1$, through $202_{n-1}$, the destination for CPU 203 is branched to the first bank address of a next one of memory banks $202_2$ through $202_n$. However, the readout destination for CPU 203 may be branched to an arbitrary bank address of first memory bank $202_1$, by the bank switching instruction in main memory 201, and each time the readout destination for CPU 203 reaches the final bank address of each of first through (n-1)th memory banks $202_1$, through $202_{n-1}$, the destination for CPU 203 may be branched to an arbitrary bank address of a next one of memory banks $202_2$ through $202_n$.

In the illustrated embodiment, the main return instruction is set in the final bank address of nth memory banks $202_n$, and CPU 203 which has read the main return instruction branches its readout destination to the main address next to the main address where the bank switching instruction is stored in main memory 201. However, the main return instruction may be set in an arbitrary bank address of nth memory banks $202_n$, and CPU 203 which has read the main return instruction branches its readout destination to an arbitrary main address of main memory 201.

In the illustrated embodiment, one bank switching instruction is set in main memory 201, and each time the readout destination for CPU 203 reaches one bank address of each of first through (n-1)th memory banks $202_1$, through $202_{n-1}$, the destination for CPU 203 is branched to a next one of memory banks $202_2$ through $202_n$. However, as shown in FIG. 6, bank switching instructions may be stored in an arbitrary plurality of main addresses of main memory 201, and each time the readout destination for CPU 203 reaches one of the bank addresses of each of first through (n-1)th memory banks $202_1$, through $202_{n-1}$, the destination for CPU 203 is branched to a next one of memory banks $202_2$ through $202_n$. According to this modification, when CPU 203 which reads stored data in main memory 201 successively from its main addresses beginning with the first main address reads a first bank switching instruction from an arbitrary first main address, the readout destination for CPU 203 is branched to the first bank address of first memory bank $202_1$. Then, CPU 203 reads stored data in first memory bank $202_1$, successively from its bank addresses beginning with the first bank address, and when the first virtual space is reached with an arbitrary first bank address, the readout destination for CPU 203 is branched to the first bank address of next memory bank $202_2$ by bank switching circuit 204. The above branching process is repeated in the subsequent memory banks 202. When CPU 203 reads the first main return instruction from nth memory bank $202_n$, the readout destination for CPU 203 is branched to the main address next to the main address where the first bank switching instruction is stored in main memory 201.

When CPU 203 reads the second bank switching instruction, the readout destination for CPU 203 is branched to the bank address next to the first virtual space in first memory bank $202_1$. Subsequently, the readout destination for CPU 203 is shifted from main memory 201 successively to memory banks $202_1$, through $202_n$, and then returned to main memory 201.

If a plurality of bank switching instructions are set in main memory 201, as described above, then it is possible to set such bank switching instructions in arbitrary main addresses of main memory 201, or it is also possible to set bank switching instructions in a plurality of final main addresses of main memory 201, and set a main branching instruction for branching to those bank switching instructions may be set in an arbitrary main address of main memory 201.

While preferred embodiments of the present invention have been described using specific terms, such description is for illustrative purposes only, and it is to be understood that changes and variations may be made without departing from the spirit or scope of the appended claims.

What is claimed is:

1. A data processing apparatus comprising:
   a main memory having a plurality of successive memory spaces with a series of main addresses set thereto;
   first through nth memory banks having a plurality of successive memory spaces with a series of bank addresses set commonly thereto;
   a data processing circuit for reading stored data in said main memory and said memory banks successively from said main addresses and said bank addresses; and
   bank switching means for controlling a memory bank as a readout destination for said data processing circuit;
   said main memory storing in an arbitrary memory space thereof a bank switching instruction which designates a first bank address of the first memory bank, said first through (n-1)th memory banks each having a virtual space where no stored data is present in respective final bank address thereof, said nth memory bank storing in the memory space represented by the final bank address thereof a main return instruction which designates a particular main address of said main memory;
   said data processing circuit having means for switching the readout destination therefor to the first bank address of the first memory bank when the data processing circuit reads said bank switching instruction from said main memory, and switching the readout destination to said particular main address when the data processing circuit reads said main return instruction from the final bank address of said nth memory bank;
   said bank switching means comprising means for switching said readout destination to the first bank address of each of the second through nth memory banks each time the readout destination for the data processing circuit reaches the bank address of the virtual space in each of the first through (n-1)th memory banks.

2. A data processing apparatus according to claim 1, wherein said particular main address of said main memory is a main address next to the main address where said bank instruction is stored.

3. A data processing apparatus comprising:
   a main memory having a plurality of successive memory spaces with a series of main addresses set thereto;
   first through nth memory banks having a plurality of successive memory spaces with a series of bank addresses set commonly thereto;
   a data processing circuit for reading stored data in the memory spaces in said main memory and said memory banks successively from said main addresses and said bank addresses; and
   bank switching means for controlling a readout destination for said data processing circuit;
   said main memory storing in an arbitrary memory space thereof a bank switching instruction which designates a particular bank address of the first memory bank, said first through (n-1)th memory banks each having a virtual space where no stored data is present in respective particular bank address thereof, said nth memory bank storing in the memory space represented by a particular bank address thereof a main return instruction which designates a particular main address of said main memory;
   said data processing circuit having means for switching the readout destination therefor to said particular bank address of the first memory bank when the data processing circuit reads said bank switching instruction from said main memory, and switching the readout destination to said particular main address when the data processing circuit reads said main return instruction from said nth memory bank;
   said bank switching means comprising means for switching said readout destination to the particular bank address of each of the second through nth memory banks each time the readout destination for the data processing circuit reaches the bank address of the virtual space in each of the first through (n-1)th memory banks.

4. A data processing apparatus according to claim 3, wherein said particular main address of said main memory is a main address next to the main address where said bank instruction is stored.

5. A data processing apparatus comprising:
   a main memory having a plurality of successive memory spaces with a series of main addresses set thereto;
   first through nth memory banks having a plurality of successive memory spaces with a series of bank addresses set commonly thereto;
   a data processing circuit for reading stored data in the memory spaces in said main memory and said memory banks successively from said main addresses and said bank addresses; and
   bank switching means for controlling a bank address as a readout destination for said data processing circuit;
   said main memory storing in arbitrary memory spaces thereof bank switching instructions which designate a plurality of bank addresses of the first memory bank, said first through (n-1)th memory banks each having virtual spaces where no stored data is present in respective bank addresses thereof, said nth memory bank storing in the memory spaces represented by said bank addresses thereof main return instructions which designate particular main addresses of said main memory;
   said data processing circuit having means for switching the readout destination therefor to a head address or a corresponding bank address of said first memory bank each time the data processing circuit reads one of the bank switching instructions from said main memory, and switching the readout destination to a corresponding particular main address of said main memory each time the data processing circuit reads one of said main return instructions from said nth memory bank;

said bank switching means comprising means for switching said readout destination to a predetermined bank address of each of the second through nth memory banks each time the readout destination for the data processing circuit reaches the bank address of the virtual space in each of the first through (n-1)th memory banks.

6. A data processing apparatus according to claim 5, wherein said particular main addresses of said main memory are main addresses next to the main addresses where said bank instructions are stored.

7. A method of reading data from a main memory having a plurality of successive memory spaces with a series of main addresses set thereto and first through nth memory banks having a plurality of successive memory spaces with a series of bank addresses set commonly thereto, of a data processing apparatus, said main memory storing in an arbitrary memory space thereof a bank switching instruction which designates a particular bank address of the first memory bank, said first through (n-1)th memory banks having virtual spaces where no stored data is present in respective particular bank addresses thereof, said nth memory bank storing in the memory space represented by a particular bank address thereof a main return instruction which designates a particular main address of said main memory, said method comprising the steps of:

setting a head address of said main memory;

reading data from said main memory;

determining whether the read data is the bank switching instruction or not;

if the read data is not the bank switching instruction, determining whether the main address is the final address of said main memory or not;

if the main address is not the final address, increasing the main address by one;

if the read data is the bank switching instruction, setting a memory bank number to 1;

setting the head address of said main memory to a bank address;

reading data from said bank address of the memory bank represented by said memory bank number;

determining whether the read data is virtual space data or not;

if the read data is virtual space data, increasing said memory bank number by one and going back to the step of setting a head address of said main memory;

if the read data is not virtual space data, determining whether the read data is the main return instruction or not; and if the read data is not the main return instruction, increasing said bank address by one and going back to the step of reading data from said main memory.

8. A computer program for reading data from a main memory having a plurality of successive memory spaces with a series of main addresses set thereto and first through nth memory banks having a plurality of successive memory spaces with a series of bank addresses set commonly thereto, of a data processing apparatus, said main memory storing in an arbitrary memory space thereof a bank switching instruction which designates a particular bank address of the first memory bank, said first through (n-1)th memory banks having virtual spaces where no stored data is present in respective particular bank addresses thereof, said nth memory bank storing in the memory space represented by a particular bank address thereof a main return instruction which designates a particular main address of said main memory, said computer program comprising the steps of:

setting a head address of said main memory;

reading data from said main memory;

determining whether the read data is the bank switching instruction or not;

if the read data is not the bank switching instruction, determining whether the main address is the final address of said main memory or not;

if the main address is not the final address, increasing the main address by one;

if the read data is the bank switching instruction, setting a memory bank number to 1;

setting the head address of said main memory to a bank address;

reading data from said bank address of the memory bank represented by said memory bank number;

determining whether the read data is virtual space data or not;

if the read data is virtual space data, increasing said memory bank number by one and going back to the step of setting a head address of said main memory;

if the read data is not virtual space data, determining whether the read data is the main return instruction or not; and if the read data is not the main return instruction, increasing said bank address by one and going back to the step of reading data from said main memory.

* * * * *